(12) United States Patent
Schombert (10) Patent No.: US 8,978,869 B2
(45) Date of Patent: Mar. 17, 2015

(54) CENTRIFUGAL BOWL PARTS FEEDER SYSTEM WITH SEGMENTED TOOLING SECTIONS

(71) Applicant: Greg Schombert, Knightstown, IN (US)

(72) Inventor: Greg Schombert, Knightstown, IN (US)

( * ) Notice: Subject to any disclaimer, the term of this patent is extended or adjusted under 35 U.S.C. 154(b) by 0 days.

(21) Appl. No.: 14/177,274

(22) Filed: Feb. 11, 2014

(65) Prior Publication Data

US 2014/0238818 A1    Aug. 28, 2014

Related U.S. Application Data (60) Provisional application No. 61/767,835, filed on Feb. 22, 2013.

(51) Int. Cl.
   *B65G 47/14*    (2006.01)

(52) U.S. Cl.
   CPC ........ *B65G 47/1464* (2013.01); *B65G 47/1457* (2013.01)
   USPC ........................................................ 198/392

(58) Field of Classification Search
   CPC ........................ B65G 47/1457; B65G 47/1464
   USPC .......................................... 198/392, 391, 757
   See application file for complete search history.

(56) References Cited

U.S. PATENT DOCUMENTS

| 1,489,926 | A | | 4/1924 | Burtchaell | |
|---|---|---|---|---|---|
| 2,464,216 | A | | 3/1949 | Devol | |
| 2,609,914 | A | | 9/1952 | Balsiger et al. | |
| 3,049,215 | A | | 8/1962 | Hutter et al. | |
| 3,471,000 | A | | 10/1969 | Bodolay et al. | |
| 3,601,041 | A | | 8/1971 | Perra, Jr. | |
| 3,912,120 | A | | 10/1975 | Edmunds | |
| 3,960,293 | A | | 6/1976 | Sweet et al. | |
| 4,266,653 | A | * | 5/1981 | Mergl | 198/392 |
| 4,821,920 | A | | 4/1989 | Lin et al. | |
| 5,145,051 | A | * | 9/1992 | Hoppmann | 198/396 |
| 5,740,899 | A | | 4/1998 | Pugh et al. | |
| 6,302,258 | B1 | * | 10/2001 | Verona | 198/392 |
| 7,861,846 | B1 | * | 1/2011 | Salditch et al. | 198/392 |
| 2009/0308714 | A1 | * | 12/2009 | Charpentier et al. | 198/392 |
| 2010/0314216 | A1 | * | 12/2010 | Lanfranchi | 198/392 |

FOREIGN PATENT DOCUMENTS

FR    A1390960    3/1965

* cited by examiner

*Primary Examiner* — Mark A Deuble (74) *Attorney, Agent, or Firm* — Ritchison Law Offices, PC; John D Ritchison (57) ABSTRACT

A centrifugal bowl parts feeder system with segmented tooling sections, the feeder system having segmented sections for a common centrifugal feeder bowl. The sections can be quickly and less expensively changed between various part sizes and configurations. With this system one can add and remove tooling segments (outside the bowl); securely and precisely locate the tooling segment with solid pins; maintain and use a tool RFID address to track specific parts and ranges of parts with a PLC Control as the bowl is modified; and harmonize the tooling segments and parts with RFID Tags tied to the PLC and the Tooling segments.

8 Claims, 9 Drawing Sheets

CENTRIFUGAL BOWL PARTS FEEDER SYSTEM WITH SEGMENTED TOOLING SECTIONS

CROSS-REFERENCE TO RELATED APPLICATIONS

This application claims the benefit of Provisional Patent Application Ser. No. 61/767,835 filed Feb. 22, 2013 by Greg Schombert and entitled "Improved Centrifugal bowl parts feeder system with Segmented tooling sections".

FIELD OF INVENTION

This invention relates to a centrifugal bowl parts feeder system with segmented tooling sections. Particularly this system is related to feeder mechanisms that are used to orient and place parts for manufacturing operations. With this new centrifugal feeder system, one is able to add or remove tooled segments (outside the main bowl); securely locate the tooled segment precisely located with solid pins; maintain and use a tooling address to track a specific part or range of parts for similar sizes or shapes with the programmable logic controller (PLC Controls) as the bowl is changed or switched over for use with the different tooled segments; track the tooled segments; and control the tooling segments with specific production parts and thereby coordinate and harmonize their use with radio frequency identification (RFID) tags associated to PLC and specific segmented tooling. All this is accomplished with a machine system for orienting and aligning articles that uses a standardized Hoppmann™ centrifugal bowl feeder or equal type of centrifugal feeder system.

This invention further relates generally relates to article handling equipment and, more particularly, to other rotary feeders for transferring articles from a reservoir to a support surface positioned adjacent thereto; relates to the field of article feed mechanisms and sorters, and more particularly to the centrifugal parts feeders; relates to a device for automatically sorting elements, such as caps and the like, and feeding the elements to a discharge point in a specific orientation; and, relates to devices and methods for loading parts or components into machines at high rates of speed in a continuous motion.

FEDERALLY SPONSORED RESEARCH

None.

SEQUENCE LISTING OR PROGRAM

None.

BACKGROUND

Field of Invention and Prior Art

As far as known, there are no Centrifugal bowl parts feeder system with Segmented tooling sections or the like. It is believed that this product is unique in its design and technologies.

Component feeding in automated assembly machines normally involves three aspects: (i) singulation, which is the separation of multiple components so they can be manipulated individually, (ii) orientation, which is the manipulation of components into a specific orientation required for the next processing step; and (iii) escapement, which is the controlled separation and transfer of components from the end of a line and insertion into a processing machine, e.g., an assembly machine at a specific spacing between components, as required by the processing machine. Escapement can also include additional aspects of singulation and orientation. Traditionally, this has been done with vibratory feeders, mechanical tumble feeders or centrifugal bowl devices.

Vibratory feeders of a certain character are disclosed in U.S. Pat. No. 2,609,914 (issued to Balsiger et al. in 1952 entitled "Article Feeding Device") and U.S. Pat. No. 2,464,216 (issued to Devol in 1949 and entitled "Vibratory Conveyor") are known. The referenced patents fail to show the advantageous, securely changeable tooling segments of the Schombert system. These feeders rely on vibration of a bowl and an interior helical type peripheral track to feed small parts. By and large, the feed rates of such units are limited to 30 feet per minute for the maximum practical rate of parts which must be fed and oriented. Mechanical tumble type feeders have been known for years and can be used for feeding headed parts. Such feeders, however, tumble screws, nails, and other parts in the same manner as a cement mixer tumbles the cement. This action can be abrasive and accordingly is undesirable. In addition, at higher speeds, the mechanical tumble feeders in which the cylindrical axis approximates the horizontal at higher speeds in effect become vertical centrifugal feeders. Also known is the centrifugal feeder in which the axis of rotation is within 45 degrees of the vertical. Heretofore such feeders have been used primarily for the feeding of billets and other large crude parts (see U.S. Pat. No. 1,489,926 (issued to Burtchaell in 1923 entitled "Conveyor") and U.S. Pat. No. 3,049,215 (issued to J. F. Hutter et al in 1962 entitled "Single Row Feeder"). Neither of the referenced patents shows the advantageous, securely changeable tooling segments with feedback to the PCL controller of the Schombert system.

A U.S. Pat. No. 3,601,041 (issued to Andrew Perra, Jr. in 1971 entitled "Apparatus for feeding and printing tablets and capsules") describes an apparatus for feeding and orienting parts such as tablets or capsules. Capsules are carried by a hopper set over a rotating disc having slotted radial paths. As the capsules fall from the hopper onto the rotating disc, they are centrifugally thrown toward the outer periphery along the slotted paths and urged into the slots in an end-to-end aligned relation. The capsules are passed between printing members in their oriented position and then discharged into a hopper. This patent fails to show the advantageous, securely changeable tooling segments of the Schombert system. A further U.S. Pat. No. 3,471,000 (issued to Bodolay et al. in 1969 entitled "Pre-Packaging Mechanism") describes a mechanism for orienting and feeding such as fruit and produce to a location for packaging. Still further other patents are: U.S. Pat. No. 3,912,120, (issued to Hoppmann et al. in 1975 entitled "Centrifugal method of sorting and orienting particulate articles"). Another U.S. Pat. No. 3,960,293 (issued to Sweet et al in 1976 is entitled "Centrifugal arranging and feeding apparatus"). A patent issued as U.S. Pat. No. 4,821,920 (issued to Lin et al. in 1989 entitled "Method and apparatus for loading articles onto feeder by elevating ramp segments") and U.S. Pat. No. 5,740,899 (issued to Pugh et al. in 1998 entitled "Positive spacing conveyor apparatus") also describe rotating mechanisms and apparatus for feeding, orienting, and/or separating articles. None of these referenced patents show the advantageous, securely changeable tooling segments of the Schombert system.

Hoppmann™, a leader in feeder mechanisms, provides centrifugal feeders that show other improvements. In Patent FR-A-1390960 (Hoppmann™ French application) discloses a machine for orienting and aligning articles of the type described above, in which the space inside the perimetric ring of the rotary structure where the orientation cavities are located and the alignment conduits define a container for the disordered articles, having a cylindrical wall rotating with a rotating structure and a stationary convex conical bottom to propel the disordered articles towards the cylindrical walls. The mentioned convex conical bottom is at a lower level than the orientation cavities. Adjacent to the rotating cylindrical wall there is a stationary helical ramp cooperating with vertical ribs projecting from the rotating cylindrical wall to raise the articles from the bottom of the container to the orientation cavities. A number of positioning machines based on the operating principle described in the mentioned patent FR-A-1390960 have subsequently appeared. However, the implementation of the rotating cylindrical wall and the stationary bottom and ramp traditionally involves a relatively complex construction that negatively affects the manufacturing cost and productive performance of the machine.

Lately, automated flexible assembly systems (FAS) are capable of being programmed to assemble several different products on a single assembly line with minimal equipment changes. For manufacturers who produce several different products in volumes too small to justify the expense of having a separate assembly line for each product, FASs provide a more economical than traditional manual or dedicated automated production methods. FASs allow a manufacturer to produce several different products in limited volumes with essentially the same amount of equipment that would be necessary to produce a single product in high production volumes. Flexible assembly systems are also advantageous over dedicated automated systems because when a product is updated or redesigned, a FAS typically can be modified to produce the new, redesigned product with minimal or no equipment changes.

In accordance with the above described characteristics, FASs require parts feeding systems which can feed a variety of different parts on command in proper orientation, position and spacing to the part manipulator (such as a robotic arm or machine tool). The common type of parts feeder comprises a cylindrical container with a spiral track or groove extending from the floor of the container base to the top rim. The entire assembly is motivated by centrifugal force or a helical vibration which tends to convey the parts through the spiral track. Disposed along the path/track are one or more guides, for example, a height bar, which tend to orient the part in the desired orientation or, if the part cannot be properly oriented, will not let the part continue up the track. A part which cannot pass through the guide will eventually fall from the track back to the bottom of the cylindrical container and start its way back up the track again. This time the part is possibly in an orientation which can pass through the guide or guides. Conventional bowl feeders—centrifugal or vibratory—must be custom tooled to a single part, or a small number of parts which are substantially identical in size and shape and are, therefore, inappropriate for FAS use. As far as known, there are no Centrifugal bowl parts feeder system with Segmented tooling sections or the like. It is believed that this product is unique in its design and technologies.

SUMMARY OF THE INVENTION

This invention is a centrifugal bowl parts feeder system with Segmented tooling sections. Taught here are the ways a feeder system may have segmented sections for a common bowl in order to quickly and less expensively change the operation between various part sizes and configurations. One is able to add or remove segments (outside the bowl); locate the segment located with solid pins; maintain and use a tool address to track part or range of parts for similar size or shape with the PLC Controls as the bowl is changed for use with the new segments; track segments and control parts and coordinate and harmonize their use with RFID Tags tied to PLC and Tooling. All this is accomplished with a machine system for orienting and aligning articles that uses a standardized Hoppmann™ centrifugal bowl feeder or equal.

The preferred embodiment of an improvement device to a centrifugal bowl parts feeder system (30) with segmented tooling sections (31) comprised of—a. at least one top segment plate (31) having a smooth and flat top surface (41), a smooth and flat bottom surface (42), two smooth and flat ends (43) essentially perpendicular to an horizontal base plate (34), and two smooth sides (44, 44A), the inner side (44) being essentially formed as an inner peripheral curve (45) and the outer side (44A) essentially as a segment of a polygon, the top surface (41) having an aperture (46) throughout to the bottom surface (42) for a means (33) for quick locking the top segmented plate (31) to a paired and internally threaded aperture (47) in a base plate (34) of the centrifugal feeder (30A), at least one aperture (48) for connecting a means [cleat (84)] for removably securing a tooling ring (81) along the inner peripheral curve of the side (44), and a RFID tag and/or bar code (63) on bottom surface (41) for reading the information and with specific information as to make, model and size of part being fed by feeder (30), the bottom surface (42) having at least one aperture (46) paired to the top aperture (49) of the base plate (34) for receiving a (tapered) dowel pin (32) and the bottom surface (42) being contiguously placed on a top surface (41) of the base plate (34); the ends (43) each having a connecting means (52) [puzzle/dogbone configuration] for differentiating each top segment plate (31) and each end (43) of the top segment plate (31) from another top segment plate (31 A, etc.); b. the connecting means (52) [puzzle/dogbone configuration] c. the cleat (84) with a means (48) for removably and securely connecting the tooling ring (81) to the inner peripheral curve (45); d. the means, for removably securing the cleat (84) to the tooling ring (81), comprised of a [hat and threaded rod]; e. the tooling ring (81) with a means (53) for removably and securely connecting at least one selection tool (89, 90, 92) device; f. a means (55) for electrically connecting the selection tool device (89, 90, 92) to a PLC (62); g. a means (56) for mechanically and pneumatically connecting the selection tool (89, 90, 92) device to utilities; h. the at least one selection tool (89, 90, 92) device; i. the PLC (Programmable Logic Controller) (62); j. a means to read RFID (Radio Frequency Identification tag and/or bar code (62) (barcode is an optical machine-readable representation of data relating to the object to which it is attached); k. a means to transfer specific output information from RFID tags and/or bar codes (62) to input information to the PLC (63); l. the base plate (34) of the centrifugal feeder system (30A) with a top surface (54), the said top surface (54) having at least one (tapered) apertures (49) for receiving the dowel pin (32); m. at least one dowel pin (32) for each base plate (34) aperture (49) paired to the bottom surface (42) apertures (46) of the top plate (31); and n. the means (33) for quick locking [threaded rod and handle] for removably and securely attaching the top plate (31) through the paired apertures (46, 49) into the base plate (34) wherein one is able to add or remove top segment plates (31) (outside the bowl); locate the top segment plates (31) with solid dowel pins (32); maintain and use a tool address barcode and RFID tags (63) to track part (60) or range of parts for similar size or shape with the PLC Controls (62) as the bowl (30A) is changed for use with the new segments (31); track segments (31) and control parts to coordinate/harmonize their use with RFID Tags (62) tied to PLC (63) and Tooling devices (89,90, 92), and all this is accomplished with a machine system for orienting and aligning articles that uses a standardized Hoppmann™ centrifugal bowl feeder (30A) or equal.

The improved centrifugal bowl parts feeder system with Segmented tooling sections may be manufactured at low volumes by very simple means and in high volume production by more complex and controlled systems.

Objects and Advantages

There are several objects and advantages of the centrifugal bowl parts feeder system with Segmented tooling sections. There are currently no known feeder systems that are effective at providing the objects of this invention. In view of the foregoing, it is a principal object of the present invention to provide a centrifugal feeder that will accomplish the following:

| Item | Object/Benefit |
| --- | --- |
| 1 | Is adaptable to a wide variety of parts constructions without substantial modification and, indeed, in many instances by simple program changes in the PLC. |
| 2 | Provides an improved parts feeding system for a flexible assembly system. |
| 3 | Provides an automatically reconfigurable parts feeding system that can be adapted to feed parts of a wide variety of shapes and sizes without the need for manual intervention or changing of parts of the feeding system. |
| 4 | Provides a parts feeding system which can rapidly change the model of parts being fed through the system. |
| 5 | Provides a parts feeding system which requires a minimal amount of tool knowledge to changeover from model to model - a no touch change-over. |
| 6 | Permits retooling and new tooling at a remote location without removing the feeder from the manufacturing operation. |
| 7 | Reduces the cost (investment and expense) of new systems by retooling only the segmented tooling rings. |
| 8 | Permits common start-up simultaneously at various plant locations. |
| 9 | Is wholly programmable with the PLC controlling the selectors at the tooling ring. |

Finally, other advantages and additional features of the present the centrifugal bowl parts feeder system with Segmented tooling sections will be more apparent from the accompanying drawings and from the full description of the device. For one skilled in the art of centrifugal feeder systems and automated parts feeding systems and the like, it is readily understood that the features shown in the examples with this product are readily adapted to other types of feeder systems within the spirit and scope of this invention.

DESCRIPTION OF THE DRAWINGS

Figures

The accompanying drawings, which are incorporated in and constitute a part of this specification, illustrate an embodiment of the centrifugal bowl parts feeder system with Segmented tooling sections device that is preferred. The drawings together with the summary description given above and a detailed description given below serve to explain the principles of the Segmented tooling sections for centrifugal bowl parts feeder systems. It is understood, however, that the centrifugal bowl parts feeder system with Segmented tooling sections is not limited to only the precise arrangements and instrumentalities shown.

REFERENCE NUMERALS

The following list refers to the drawings:

TABLE B

Reference numbers

| Ref # | Description |
| --- | --- |
| 30 | General centrifugal parts feeder systems with segmented tooling sections |
| 30A | Traditional Hoppmann ™ type centrifugal parts feeder system including a motor system 38, base plate 34, support 35, 35A, feeder tub 87, center disk 88, and drive(s) 99, 100 |
| 31, 31A, 31B, and 31C | Segmented tooling sections on the centrifugal bowl parts feeder system with Segmented tooling sections |
| 32 | Means for fastening such as Tapered dowel pins |
| 32A | Threaded area of fasteners |
| 33 | Means for quickly locking or removably fastening |
| 34 | Base plate for feeder parts system 30 and 30A |
| 35 | Support structural post |
| 35A | Mid support post |
| 36 | Support base under motor mount and feeder |
| 37 | Tapered dowel pins between base plate 34 and tooling section plate 31 |
| 38 | Motor, mounts and gear reduction devices |
| 39 | Enclosure system for feeder such as the sides and top enclosures for sound control |
| 40 | General isometric views of the centrifugal bowl parts feeder system with Segmented tooling sections |
| 41 | Top surface of section 31 |
| 42 | Smooth, flat bottom surface of section 31 |
| 43 | Smooth flat ends |

TABLE B-continued

Reference numbers

| Ref # | Description |
|---|---|
| 44 | inner smooth side being essentially formed as an inner peripheral curve 45 and the surface being essentially perpendicular to the horizontal base plate 34, |
| 44A | Outer surface or side essentially as a segment of a polygon and the surface being essentially perpendicular to the horizontal base plate 34, |
| 45 | Inner peripheral curve |
| 46 | Aperture through the top surface 41 to the bottom surface 42 |
| 47 | Internally threaded aperture in the base plate 34 |
| 48 | Aperture and means for connecting a means [cleat 84] for removably securing a tooling ring 81 along the inner peripheral curve of the side |
| 49 | top aperture of the base plate 34 for receiving a (tapered) dowel pin 32 |
| 51 | Centrifugal feeder system with various selection tools attached |
| 52 | a connecting means [puzzle/dogbone configuration] for differentiating each top segment plate 31 and each end 43 of the top segment plate 31 from another top segment plate 31A, etc. |
| 53 | A means [hat 84B and threaded connector 84A] for connecting selection tool device 89, 90, 92 to the cleat 84 |
| 54 | Top surface of base plate 34 |
| 55 | a means for electrically connecting the selection tool device 89, 90, 92 to a PLC 62; |
| 56 | a means for mechanically and pneumatically connecting the selection tool (89, 90, 92)device to utilities |
| 60 | Various specific parts (of different sizes and configurations) to orient and feed in the centrifugal bowl parts feeder system with Segmented tooling sections |
| 62 | PLC Controls/Input data sent w/ new segments |
| 63 | FID Tags tied to PLC & Tooling; Bar code; RFID I Bar tags, etc. change w/ segmented ring parts (placed on the bottom for reading) |
| 81 | Tooling ring - (aka vertical ring) vertical stainless steel wall used to mount the mechanical and pneumatic selectors required to only produce correctly oriented parts |
| 82 | Tooling ring support frame - (aka tool frame) industry standard way to mount the tooling ring |
| 83 | Height qualifier - a cam that is mounted to the tooling ring that only allows parts of a certain height to proceed downstream. Knocks off mis-oriented parts for recirculation |
| 84 | Cleat - used to support the tooling ring and allows adjustment to widen or narrow the running surface width |
| 84A | Adjustment shaft on cleat 84 |
| 84B | "hat" on tooling ring |
| 85 | Running surface - the bottom surface the part sits on when travel through the system |
| 86 | Rim width - the distance between the tooling ring and the inside edge of the feeder tub. Increasing or decreasing this distance is adjusted to aid in selecting off mis-oriented parts |
| 87 | Feeder tub (bowl) - the aluminum casting that drives the parts and gives them a platform to ride on when traveling thru the system |
| 88 | Center disc - angled abs plastic disc in the center of the feeder tub that stores and supplies parts for the feed system |
| 89 | Mechanical selector/actuator (cam) - a properly placed selector will reject mis-oriented parts or turn parts over to the required position for proper orientation |
| 90 | Pneumatic selector/actuator (air jet) - is a block with a small diameter tubing welded in place which is used to orient parts or to reject mis-oriented parts back into the center of the unit for recirculation |
| 91 | Load area - The spot where the feeder tub and the highest point of the center disc meet in which parts are loaded onto the running surface of the feeder tub |
| 92 | Selection area - the section of tooling where mechanical and pneumatic selectors are mounted to reject parts that are not in the proper orientation back into the center of the unit for recirculation |
| 93 | Entrance of discharge - section of tooling where only correctly oriented parts enter confinements to exit the system |
| 93A | Discharge extension dual discharge - it gives one the ability to either feed into a c chute for components that want to load opposite of what is required or discharge at a different position to a discharge parts that want to load correctly from the same machine |
| 94 | Top confinement - section of discharge tooling that sits above the parts to make sure they maintain proper orientation when exiting the system |
| 95 | Side confinement - vertical section of discharge tooling that directs parts when exiting feeder to transfer to downstream processes |
| 96 | Centerline - distance from the center of the centrifugal feeder to the center of a part when it is sitting in the discharge confinements |
| 97 | Bowl level sensor - monitors the part level in the feeder and turns on the elevator on demand to supply bulk parts to the system |
| 98 | High level sensor - monitors the part level on the output track and activates the back pressure relief system to stop the flow of parts when the track is full |
| 99 | Single drive - when the center disc and feeder tub are linked together with chains and sprockets and driven by a single motor and maintain a predetermined speed ratio |
| 100 | Dual drive - when the center disc and feeder tub are driven independently and speed ratios can be changed freely as needed |
| 101 | Scallop feeder - a concept that uses a series of channels mounted to the feeder tub to correctly orient parts that have a much greater length than width ratio |
| 102 | upper scallop - scallops that mount to the running surface of the feeder tub |
| 103 | lower scallop - scallops that mount to the side of the feeder tub and set below the upper scallops to keep parts confined as they transfer to the output conveyor |
| 104 | gravity track - a stationary track that is mounted on enough of an angle to transport correctly oriented parts without use of a drive mechanism |
| 105 | bulk storage hopper - A storage hopper is used to store extra parts and replenish the supply in the feeder on demand upon a signal from a sensor used to monitor part level in the feeder |
| 106 | elevator - a storage hopper with an incline belt to supply parts to a feeder with a higher running surface height |
| 107 | orientation - the correct orientation required at the discharge exit as required by the customer |
| 108 | rate - the pieces required per minute in order to supply enough correctly oriented pieces for downstream processes |
| 109 | back pressure - The force of the parts pushing one against the other as they are fed |
| 110 | back pressure relief - A sensor used to detect part levels in the discharge to control a solenoid that blows air too remove parts from the tooling. Used to keep difficult parts from jamming in tooling |

DETAILED DESCRIPTION OF PREFERRED EMBODIMENT

The present development and technology presented is a centrifugal bowl parts feeder system with Segmented tooling sections. Particularly this system is related to feeder mechanisms used to orient and place parts for manufacturing operations.

Taught here are the ways a feeder system may have segmented sections for a common bowl in order to quickly and less expensively change the operation between various part sizes and configurations. With this new centrifugal feeder system, one is able to add or remove tooled segments (outside the main bowl); securely locate the tooled segment precisely located with solid pins; maintain and use a tooling address to track a specific part or range of parts for similar sizes or shapes with the programmable logic controller (PLC Controls) as the bowl is changed or switched over for use with the different tooled segments; track the tooled segments; and control the tooling segments with specific production parts and thereby coordinate and harmonize their use with radio frequency identification (RFID) tags associated to PLC and specific segmented tooling. All this is accomplished with a machine system for orienting and aligning articles that uses a standardized Hoppmann™ centrifugal bowl feeder or equal type of centrifugal feeder system.

The advantages for the centrifugal bowl parts feeder system with Segmented tooling sections 30 are listed above in the introduction. Succinctly the benefits are that the device:

1. Is adaptable to a wide variety of parts constructions without substantial modification and, indeed, in many instances by simple program changes in the PLC
2. Provides an improved parts feeding system for a flexible assembly system
3. Provides an automatically reconfigurable parts feeding system that can be adapted to feed parts of a wide variety of shapes and sizes without the need for manual intervention or changing of parts of the feeding system
4. Provides a parts feeding system which can rapidly change the model of parts being fed through the system
5. Provides a parts feeding system which requires a minimal amount of tool knowledge to changeover from model to model—a no touch change-over
6. Permits retooling and new tooling at a remote location without removing the feeder from the manufacturing operation
7. Reduces the cost (investment and expense) of new systems by retooling only the segmented tooling rings
8. Permits common start-up simultaneously at various plant locations
9. Is wholly programmable with the PLC controlling the selectors at the tooling ring The preferred embodiment of an improvement device to a centrifugal bowl parts feeder system (30) with segmented tooling sections (31) comprised of a. at least one top segment plate (31) having a smooth and flat top surface (41), a smooth and flat bottom surface (42), two smooth and flat ends (43) essentially perpendicular to an horizontal base plate (34), and two smooth sides (44, 44A), the inner side (44) being essentially formed as an inner peripheral curve (45) and the outer side (44A) essentially as a segment of a polygon, the top surface (41) having an aperture (46) throughout to the bottom surface (42) for a means (33) for quick locking the top segmented plate (31) to a paired and internally threaded aperture (47) in a base plate (34) of the centrifugal feeder (30A) [including a motor system 38, base plate 34, support 35, 35A, feeder tub 87, center disk 88, and drive(s) 99, 100—not shown], at least one aperture (48) for connecting a means [cleat (84)] for removably securing a tooling ring (81) along the inner peripheral curve of the side (44), and a RFID tag and/or bar code (63) on bottom surface (41) for reading the information and with specific information as to make, model and size of part being fed by feeder (30), the bottom surface (42) having at least one aperture (46) paired to the top aperture (49) of the base plate (34) for receiving a (tapered) dowel pin (32) and the bottom surface (42) being contiguously placed on a top surface (41) of the base plate (34); the ends (43) each having a connecting means (52) [puzzle/dogbone configuration] for differentiating each top segment plate (31) and each end (43) of the top segment plate (31) from another top segment plate (31 A, etc.); b. the connecting means (52) [puzzle/dogbone configuration] c. the cleat (84) with a means (48) for removably and securely connecting the tooling ring (81) to the inner peripheral curve (45); d. the means, for removably securing the cleat (84) to the tooling ring (81), comprised of a [hat and threaded rod]; e. the tooling ring (81) with a means (53) for removably and securely connecting at least one selection tool (89, 90, 92) device; f. a means (55) for electrically connecting the selection tool device (89, 90, 92) to a PLC (62); g. a means (56) for mechanically and pneumatically connecting the selection tool (89, 90, 92) device to utilities; h. the at least one selection tool (89, 90, 92) device; i. the PLC (Programmable Logic Controller) (62); j. a means to read RFID (Radio Frequency Identification tag and/or bar code (62) (barcode is an optical machine-readable representation of data relating to the object to which it is attached); k. a means to transfer specific output information from RFID tags and/or bar codes (62) to input information to the PLC (63); l. the base plate (34) of the centrifugal feeder system (30A) with a top surface (54), the said top surface (54) having at least one (tapered) apertures (49) for receiving the dowel pin (32); m. at least one dowel pin (32) for each base plate (34) aperture (49) paired to the bottom surface (42) apertures (46) of the top plate (31); and n. the means (33) for quick locking [threaded rod and handle] for removably and securely attaching the top plate (31) through the paired apertures (46, 49) into the base plate (34) wherein one is able to add or remove top segment plates (31) (outside the bowl); locate the top segment plates (31) with solid dowel pins (32); maintain and use a tool address barcode and RFID tags (63) to track part (60) or range of parts for similar size or shape with the PLC Controls (62) as the bowl (30A) is changed for use with the new segments (31); track segments (31) and control parts to coordinate/harmonize their use with RFID Tags (62) tied to PLC (63) and Tooling devices (89,90, 92), and all this is accomplished with a machine system for orienting and aligning articles that uses a standardized Hoppmann™ centrifugal bowl feeder (30A) or equal.

There is shown as examples in FIGS. 1-8 complete description and operative embodiments of the centrifugal bowl parts feeder system with Segmented tooling sections. In the drawings and illustrations, one notes well that the FIGS. 1-8 demonstrate the general configuration and use of this system. The various example uses are in the operation and use section, below.

The accompanying drawings, which are incorporated in and constitute a part of this specification, illustrate an embodiment of the centrifugal bowl parts feeder system with Segmented tooling sections 30 that is preferred. The drawings together with the summary description given above and a detailed description given below serve to explain the principles of the centrifugal bowl parts feeder system with Segmented tooling sections 30. It is understood, however, that the system 30 is not limited to only the precise arrangements and instrumentalities shown. Other examples of the system and its uses are still understood by one skilled in the art of centrifugal feeder systems and automated parts feeding systems and the like to be within the scope and spirit shown here.

Figures 1A, 1B, 1C, 1D:
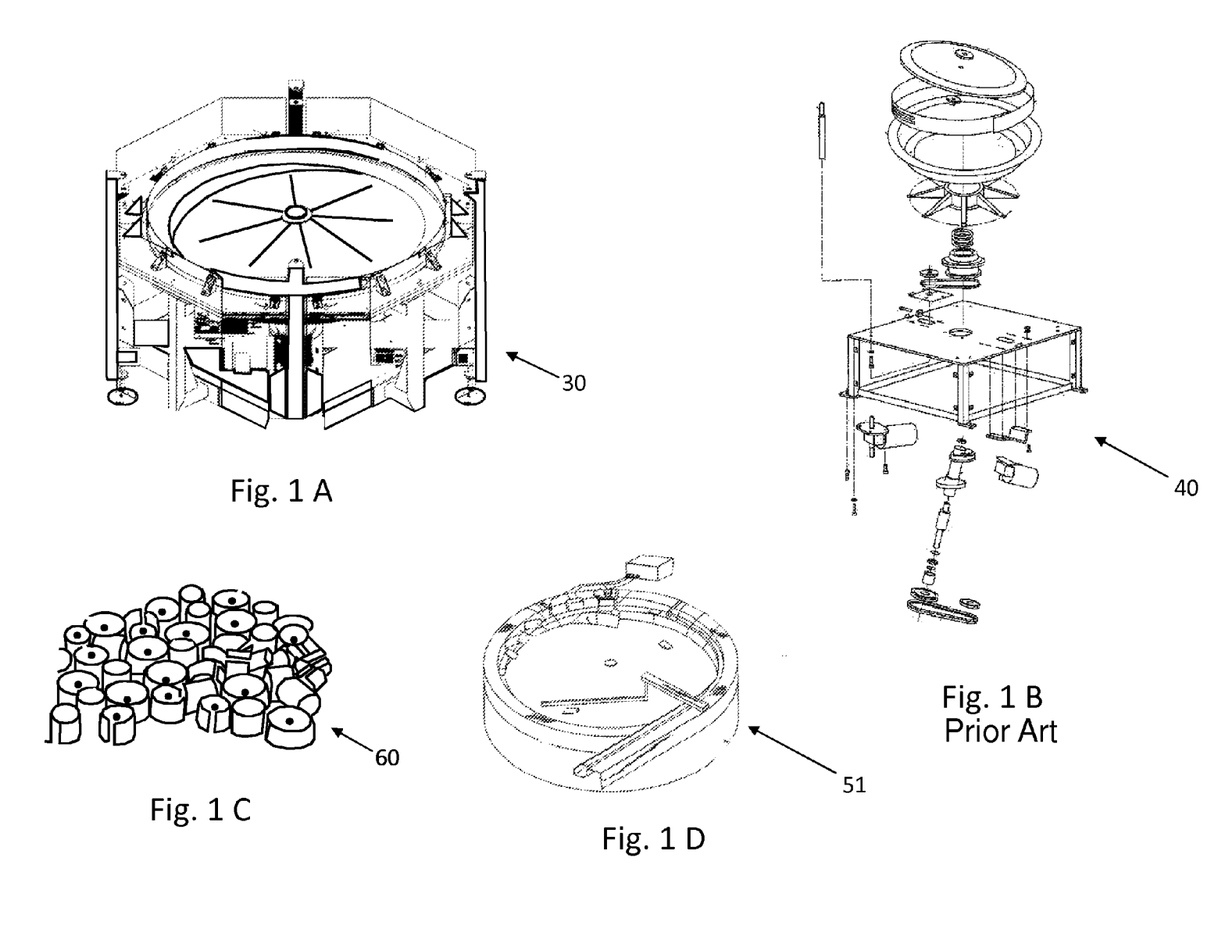
FIG. 1A is a general view of the centrifugal feeder system with segmented tool sections.
FIG. 1B is an isometric section of a traditional centrifugal feeder system.
FIG. 1C is a group of different parts for feeding.
FIG. 1D is a feeder with various tools attached to the sides to enable orientation of the parts.

FIG. 1 A is a general view of the centrifugal feeder system with segmented tool sections 30; FIG. 1 B is an isometric section of a traditional centrifugal feeder system 40; FIG. 1 C is a group of different parts 60 for feeding; and FIG. 1 D is a feeder with various tools attached 51 to the sides to enable orientation of the parts. All these are described in more detail below.

Figure 2:
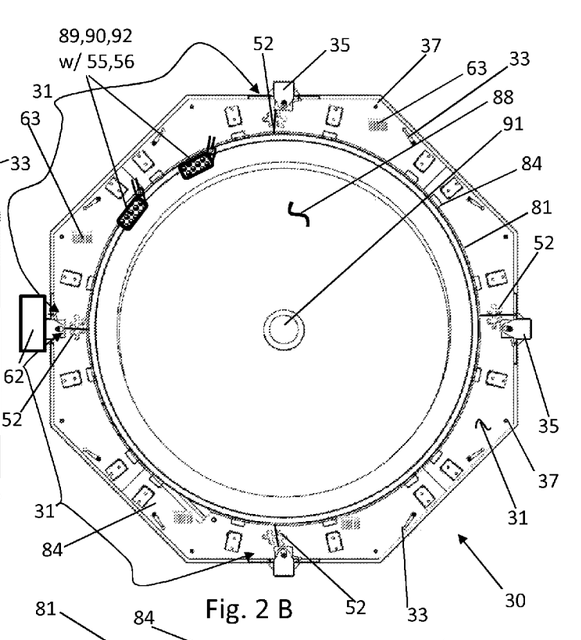
FIGS. 2A through 2D are sketches of a general centrifugal feeder system with segmented tool sections for feeding and orienting various parts with components and features noted.

FIGS. 2 A through 2 D are sketches of a general centrifugal feeder system with segmented tool sections 30 for feeding and orienting various parts 60 with components and features noted. The sketches are from different views. Here one may view the various elements of the invention. The system 30 is comprised of segmented tooling sections 31, 31A, 31B, and 31 C; means 32 for fastening such as Tapered dowel pins; threaded area of fasteners 32A; means 33 for quick lock fastening; a base plate 34 for feeder parts system 30 and 30A; a series of structural support members and posts 35; mid support post 35A; tapered dowel pins 37 between base plate 34 and tooling segmented section plates 31; motor, mounts and gear reduction devices 38; an enclosure system for a feeder such as the sides and top enclosures for sound control 39; a connecting means 52 [puzzle/dogbone configuration or equal] for uniquely differentiating each top segment plate 31 and each end 43 of the top segment plate 31 from another top segment plate 31A, etc.; a means 55 for electrically connecting the selection tool device 89, 90, 92 to a PLC 62; a means 56 for mechanically and pneumatically connecting the selection tool (89, 90, 92) device to utilities such as air, electricity, water, gas and other utilities; PLC Controls/Input data 62 sent w/new segments, RFID Tags tied to PLC & Tooling; Bar code; RFID I Bar tags, etc. 63 change w/segmented ring parts; at least one tooling ring 81 (aka vertical ring) vertical stainless steel wall used to mount the mechanical and pneumatic selectors required to only produce correctly oriented parts—or sections of the ring 81 that may be sectioned and overlapped to create an essential full ring around the upper section of the centrifugal feeder system; a cleat 84—used to support the tooling ring and allows adjustment to widen or narrow the running surface width the cleat having an adjustment shaft 84A on cleat 84 and a threaded rod 84B; a feeder tub (bowl) 87—which is the aluminum casting that drives the parts 60 and gives the parts 60 a platform to ride on when traveling thru the feeder system 30; a center disc 88—which is an angled ABS plastic disc in the center of the feeder tub that stores and supplies parts for the feed system; various types of mechanical selector/actuator (cam) 89—which are a properly placed selector that will reject mis-oriented parts or turn parts over to the required position for proper orientation; pneumatic selector/actuator (air jet) 90—which are/is a block with a small diameter tubing welded in place which is used to orient parts or to reject mis-oriented parts back into the center of the unit for recirculation; a general load area 91—also known as the spot where the feeder tub and the highest point of the center disc meet in which parts are loaded onto the running surface of the feeder tub; and, a selection area 92—known as the section of tooling where mechanical and pneumatic selectors are mounted to reject parts that are not in the proper orientation back into the center of the unit for recirculation.

Figure 3:
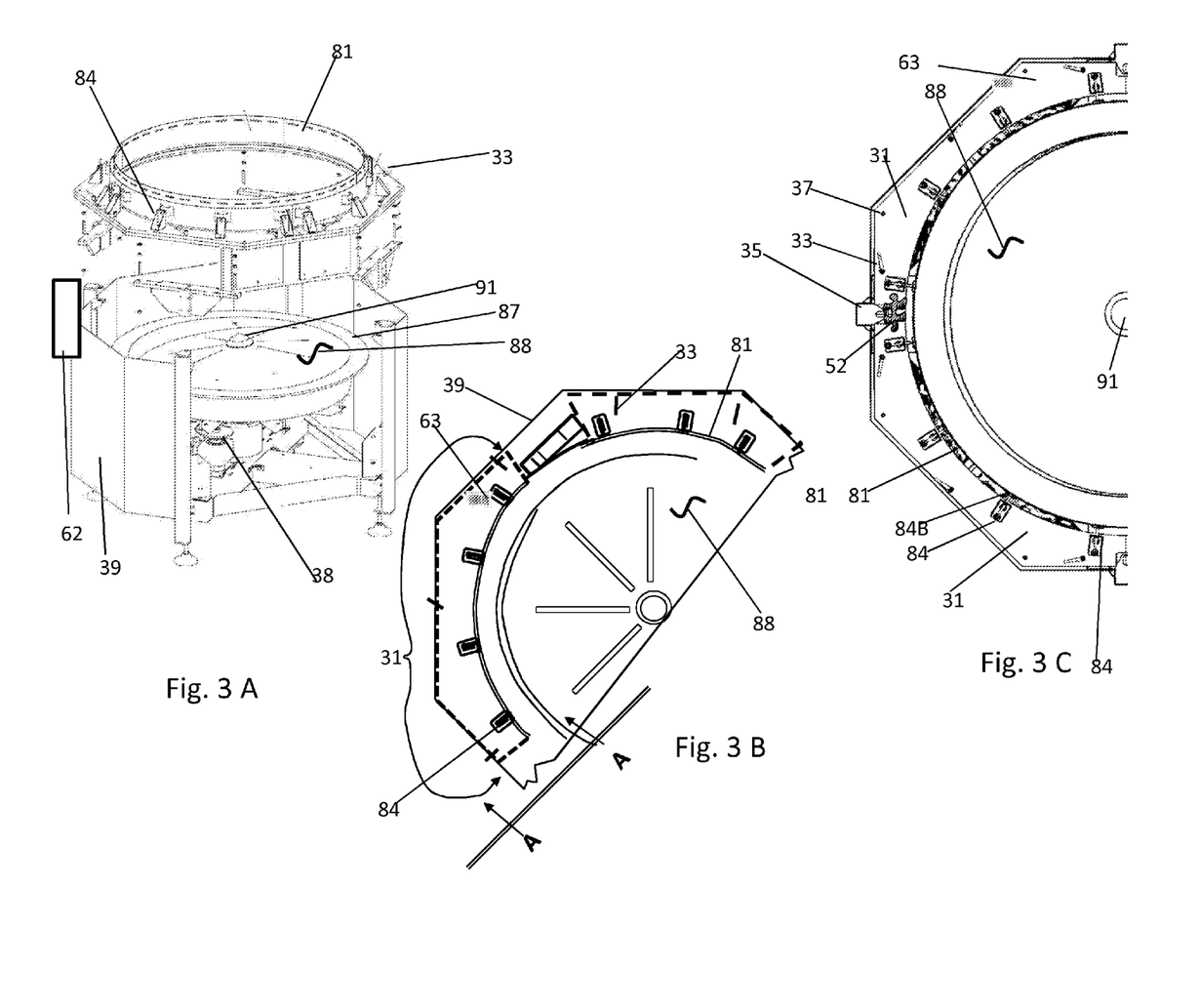
FIGS. 3A through 3G are more sketches of a general centrifugal feeder system with segmented tool sections for feeding and orienting various parts with components and features noted.

FIGS. 3 A through 3 G are more sketches of a general centrifugal feeder system 30 with segmented tool sections 31 for feeding and orienting various parts 60 with components and features noted. FIGS. 3 A through 3 C have similar parts described above. Significant and unique to this feeder system 30 is how the RFID/FID tags and barcodes 63 relate back to the PLC 62. Here a PLC or a Programmable logic controller is utilized. A programmable logic controller (PLC) or programmable controller is a digital. computer used for automation of electromechanical processes, such as control of machinery on factory assembly lines, amusement rides, or light fixtures. PLCs are used in many industries and machines. Unlike general-purpose computers, the PLC is designed for multiple inputs and output arrangements, extended temperature ranges, immunity to electrical noise, and resistance to vibration and impact. Programs to control machine operation are typically stored in battery-backed-up or non-volatile memory. A PLC an example of a hard real time system since output results must be produced in response to input conditions within a limited time, otherwise unintended operation will result. The functionality of the PLC has evolved over the years to include sequential relay control, motion control, process control, distributed control systems and networking. The data handling, storage, processing power and communication capabilities of some modern PLCs are approximately equivalent to desktop computers. PLC-like programming combined with remote I/O hardware, allow a general-purpose desktop computer to overlap some PLCs in certain applications. Regarding the practicality of these desktop computer based logic controllers, it is important to note that they have not been generally accepted in heavy industry because the desktop computers run on less stable operating systems than do PLCs, and because the desktop computer hardware is typically not designed to the same levels of tolerance to temperature, humidity, vibration, and longevity as the processors used in PLCs. In addition to the hardware limitations of desktop based logic, operating systems such as Windows do not lend themselves to deterministic logic execution, with the result that the logic may not always respond to changes in logic state or input status with the extreme consistency in timing as is expected. from PLCs. Still, such desktop logic applications find. use in. less critical situations, such as laboratory automation and use in small facilities where the application is less demanding and critical, because they are generally much less expensive than PLCs.

Along with the PLC are RFID and Bar codes 63. The RFID chip contains a radio-frequency electromagnetic field coil that modulates an external magnetic field to transfer a coded identification number when queried by a reader device. This small type is incorporated in consumer products, and even implanted in pets, for identification. Radio-frequency identification (RFID) is the use of a wireless non-contact system that uses radio-frequency electromagnetic fields to transfer data. from a tag attached to an object, for the purposes of automatic identification and tracking. Some tags require no battery and are powered by the electromagnetic fields used to read them. Others use a local power source and emit radio waves (electromagnetic radiation at radio frequencies). The tag contains electronically stored information which can be read from up to several meters (yards) away. Unlike a bar code, the tag does not need to be within line of sight of the reader and may be embedded in the tracked object. RFID tags are used in many industries. An RFID tag attached to an automobile during production can be used to track its progress through the assembly line. Pharmaceuticals can be tracked through warehouses. Tags may either be read-only, having a factory-assigned serial number that is used as a key into a database, or may be read/write, where object-specific data can be written into the tag by the system user. Field programmable tags may be write-once, read-multiple; "blank" tags may be written with an electronic product code by the user. RFID tags contain at least two parts: an integrated circuit, for storing and processing information, modulating and demodulating a radio-frequency (RF) signal, collecting DC power from the incident reader signal, and other specialized functions; and an antenna for receiving and transmitting the signal. Fixed readers are set up to create a specific interrogation zone which can be tightly controlled. This allows a highly defined reading area for when tags go in and out of the interrogation zone. Mobile readers may be hand-held or mounted on carts or vehicles. Finally, a barcode is an optical machine-readable representation of data relating to the object to which it is attached. Originally barcodes represented data by varying the widths and spacings of parallel lines, and may be referred to as linear or one-dimensional (1D). Later they evolved into rectangles, dots, hexagons and other geometric patterns in two dimensions (2D). Although 2D systems use a variety of symbols, they are generally referred to as barcodes as well. Barcodes originally were scanned by special optical scanners called. barcode readers; later, scanners and interpretive software became available on devices including desktop printers and smart phones.

FIGS. 3 D through 3 G are more details of the centrifugal bowl parts feeder system 30 with Segmented tooling sections 31. Several of the elements are repeated as described above with drawing FIG. 2. In addition, the top segmented plates 31 and the base plate 34 is further described as to features such as mounting apertures and surfaces. Here in these side and top views are the interconnections of the elements and components that make up the centrifugal bowl parts feeder system 30 with Segmented tooling sections 31. FIG. 3 D shows the side Section A-A with the mid support post 35A; base plate 34 for feeder parts system 30 and 30A; segmented tooling sections on the centrifugal bowl parts feeder system with segmented tooling sections 31, 31A, 31B, and 31 C; means 32 for fastening such as tapered dowel pins; means for Quick lock fastening 33; cleat 84—used to support the tooling ring and allows adjustment to widen or narrow the running surface width adjustment shaft 84A on cleat 84; tooling ring 81 (aka vertical ring) vertical stainless steel wall used to mount the mechanical and pneumatic selectors required to only produce correctly oriented parts; mechanical selector/actuator (cam) 89; pneumatic selector/actuator (air jet) 90; selection area 92; a means 55 for electrically connecting the selection tool device 89, 90, 92 to a PLC 62; a means 56 for mechanically and pneumatically connecting the selection tool (89, 90, 92) device to utilities; a feeder tub (bowl) 87; and the center disc 88. FIG. 3 E shows the top view of a base plate 34 for feeder parts system 30 and 30A; a top surface 54 of base plate 34; the internally threaded aperture 47 in the base plate 34; and the top aperture 49 of the base plate 34 for receiving a (tapered) dowel pin 32. FIG. 3 F shows the Segmented tooling sections on the centrifugal bowl parts feeder system with Segmented tooling sections 31, 31A, 31B, and 31 C; top surface 41 of section 31; smooth, flat bottom surface 42 of section 31; smooth flat ends 43; the inner smooth side 44 being essentially formed as an inner peripheral curve 45 and the curved surface being essentially perpendicular to the horizontal base plate 34; the outer surface or side 44A essentially as a segment of a polygon and the surface being essentially perpendicular to the horizontal base plate 34; the inner peripheral curve 45; an aperture 46 through the top surface 41 to the bottom surface 42; an aperture and means for connecting a means [cleat 84] for removably securing a tooling ring 81 along the inner peripheral curve of the side 48; a top aperture 49 of the base plate 34 for receiving a (tapered) dowel pin 32; and, a connecting means 52 [puzzle/dogbone configuration] for differentiating each top segment plate 31 and each end 43 of the top segment plate 31 from another top segment plate 31A, etc. It should be stressed that master jig fixtures are used to align all the apertures 47,48,49, etc. to make sure they are completely consistent across all machines. FIG. 3 G shows the base plate 34 and the segmented tooling sections 31 with the quick connects 33.

Figure 4:
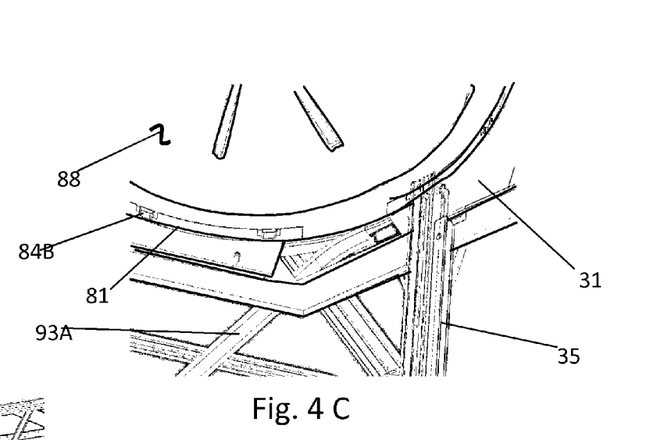
FIGS. 4A and 4D are even more sketches of a general centrifugal feeder system with segmented tool sections for feeding and orienting various parts with components and features noted.

FIGS. 4 A and 4 D are even more sketches of a general centrifugal feeder system 30 with segmented tool sections 31 for feeding and orienting various parts 60 with components and features noted. The elements and components are similar to those described in paragraphs above for FIGS. 1 through 3. One should note the discharge 93 and dual discharge 93A features. This discharge extension dual discharge gives one the ability to either feed into a chute for components that want to load opposite of what is required or discharge at a different position to a discharge parts that want to load correctly from the same machine.

Figure 5:
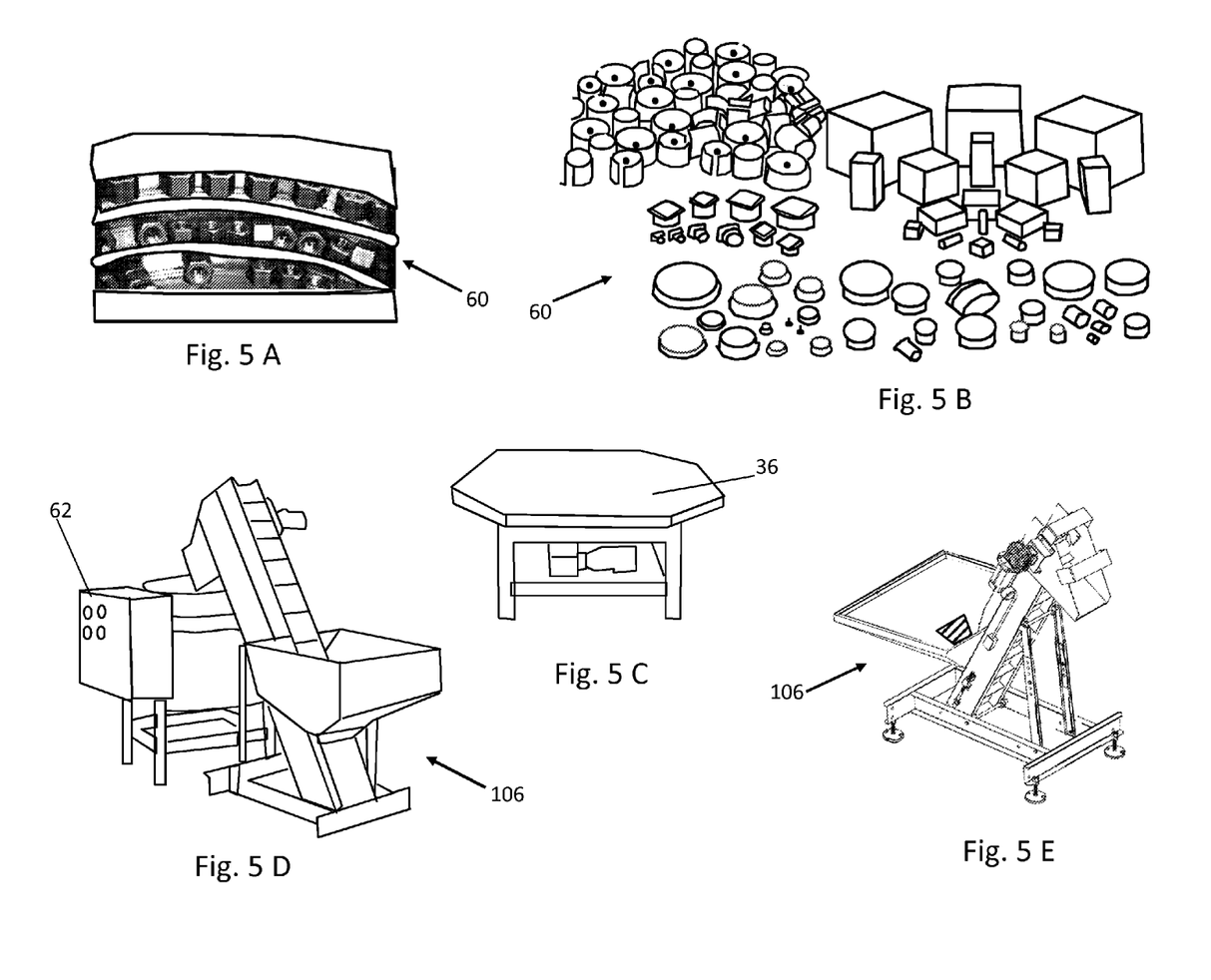
FIGS. 5A through 5E are typical parts oriented and fed by a centrifugal feeder system with segmented tool sections, a support table, and a supply hopper.

FIGS. 5 A through 5 E are typical parts oriented and fed by a centrifugal feeder system 30 with segmented tool sections 31, a support table 36, and a typical supply hopper 106. The parts are generally placed into the supply hopper and inclined conveyor. A sensor in the feeder 30 determines when more parts are needed and signals the conveyor to feed additional parts. The parts shown are for example and not as a limitation to the scope and spirit of the centrifugal bowl parts feeder system 30 with segmented tooling sections. One should note that the size, height, configuration and weight of parts may vary greatly. The new segmented parts feeder 30 anticipates a family of various feeders. One series of the segmented plates may be used with several sizes of a type part. The selection tools 89, 90, 92 may be electronically adjusted with the Barcodes/RFID tags 63 for a specific model within a family of parts. The feeder is then electronically "alerted" by the PLC 62 (when the codes 63) are read and the selection tools 89, 90, 92 automatically change the require dimensions or values to permit that specific model to be automatically fed. See the operations section below for further details.

Figure 6:
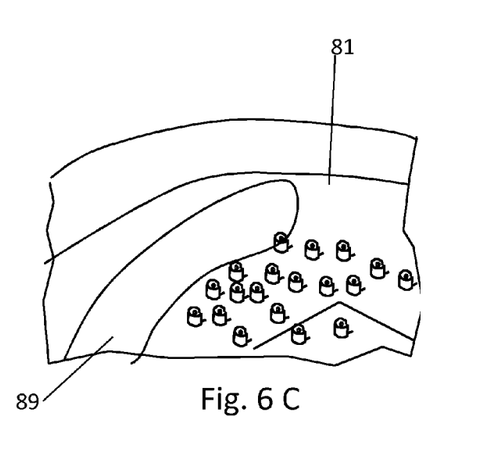
FIG. 6A through 6F are various common tools and selector/actuators mounted for use with a typical feeder and the centrifugal feeder system with segmented tool sections.

FIG. 6 A through 6 F are various common tools and selector/actuators 89, 90, 92 83, 97 mounted for use with a typical feeder and the centrifugal feeder system 30 with segmented tool sections. Better descriptions of such selection tools have been described above. The various illustrations are exemplary and not limiting to the scope of the invention.

Figure 7:
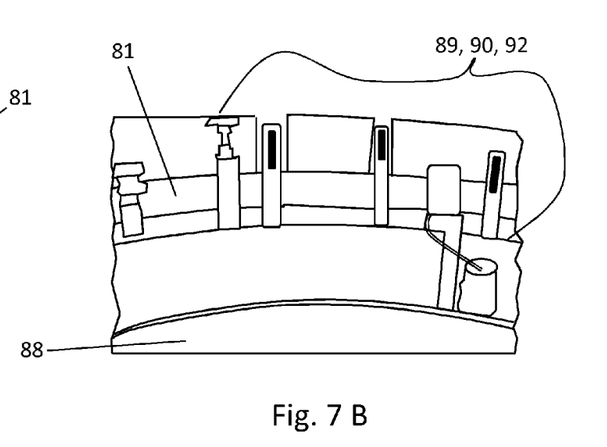
FIG. 7A through 7D are more views of the various common tools and selector/actuators mounted for use with a typical feeder and the centrifugal feeder system with segmented tool sections.

FIG. 7 A through 7 D are more views of the various common tools and selector/actuators mounted for use with a typical feeder and the centrifugal feeder system with segmented tool sections. The description for FIG. 6 applies here again.

Figure 8:
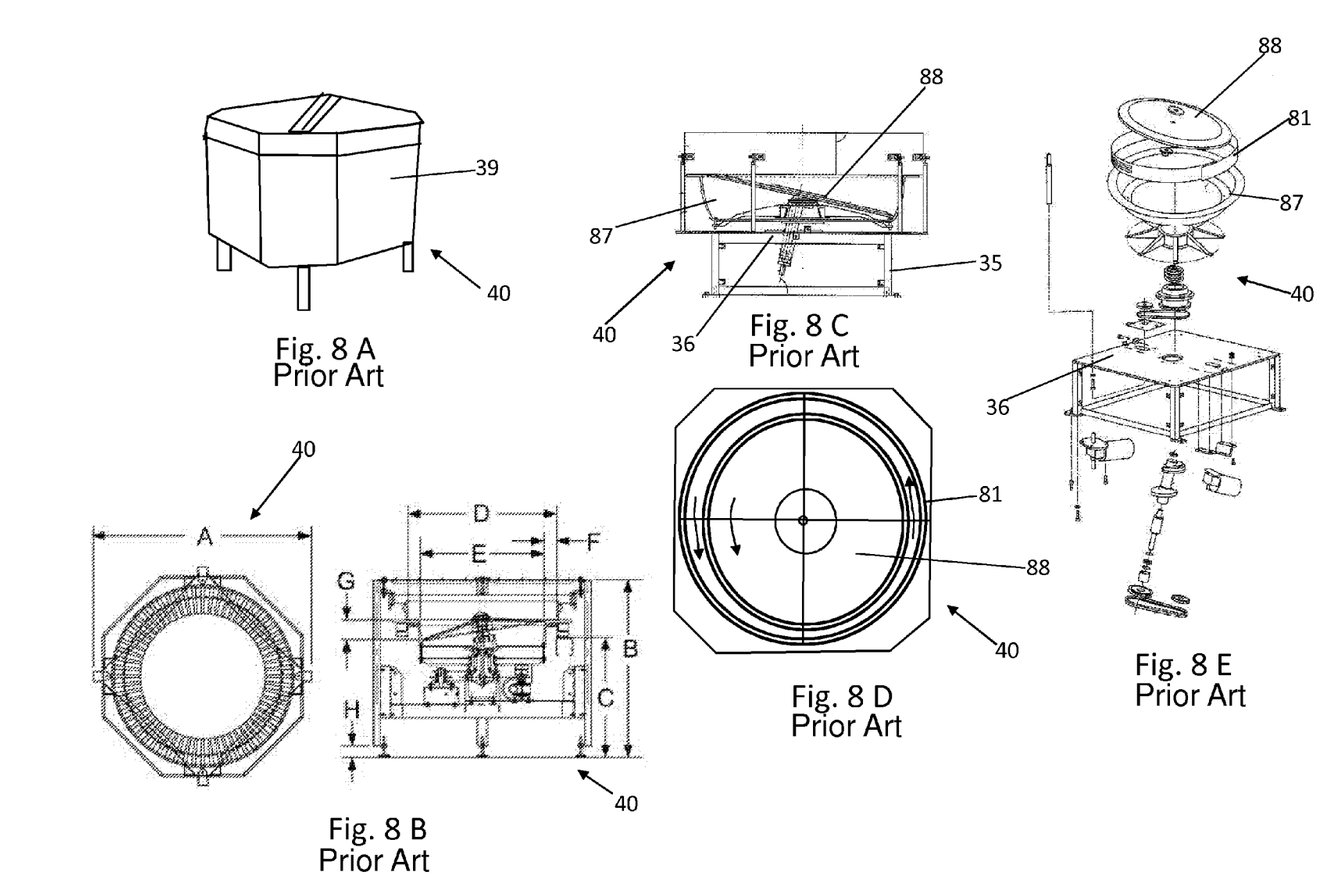
FIG. 8A through 8E are common, traditional centrifugal feeder systems shown from top, side and isometric perspectives.

FIG. 8 A through 8 E are common, traditional centrifugal feeder systems shown from top, side and isometric perspectives. The parts and uses of these elements and components are described above in the descriptions of the other Figures. The Table in shows typical Hoppman™ sizes:

|   | Product Specification | ANSI Size as Inches |
|---|---|---|
| A | Outside diameter | 65 |
| B | Frame height | 48.5 |
| C | Discharge height | 36 |
| D | Bowl outside diameter | 43.46 |
| E | Bowl inside diameter | 36.25 |
| F | Rim width | 3.61 |
| G | Bowl depth | 5.95 |
| H | Level foot adjustment | 5 +/− 2.5 |

Operation of the Preferred Embodiment

The centrifugal bowl parts feeder system 30 with Segmented tooling sections 31 has been described in the above embodiment. The manner of how the device operates is described below. One notes well that the description above and the operation described here must be taken together to fully illustrate the concept.

The centrifugal bowl parts feeder system 30 with Segmented tooling sections 31 operates somewhat similar to other systems. However, the concept of the segmented sections which are easily changed in production is a unique function. The segments also are manufactured "off-line_ and without the main feeder bowl. Therefore, expensive production delays and downtime is eliminated. Plus, companies that have several global facilities making the same or similar parts may tool-up completely offline and then have the ne or retooled sections provided to them for simultaneous introductions of products or product enhancements.

The Basic Concept works like this: The information is taken automatically or manually from each fixture and the PLC controls pneumatics and electronics of the selection tools La move cylinders or electric actuators to the proper position. Two options for data entry are:

Manual Data Entry:
A. Push buttons or selector switches are labeled with each fixture number (limited number of fixtures, mistakes if wrong button is pushed).
B. Enter fixture part. number into HMI (Mistakes if wrong fixture number is entered).

Automatic Data Entry:
A. Bar Code is placed on each fixture. Fixture changes automatically when we read bar code.
B. 2D Bar Code is placed on each fixture. Fixture changes automatically when we read bar code (Best Bar Code Option).
C. RFID Tag is placed on each fixture. Fixture changes automatically when we read REID tag (Preferred Method).
D. Vision system is used to read numbers or identifying mark on each fixture. Fixture changes automatically when we see change.

With this description it is to be understood that the Special heating floor mat for heavy duty applications device 30 is not to be limited to only the disclosed embodiment of product. The features of the Special heating floor mat for heavy duty applications device 30 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

What is claimed is:

1. A centrifugal bowl parts feeder system (30) with segmented tooling segments (31) comprised of:
   an at least one top segment (31) having a means (33) for quickly locking the at least one top segmented plate (31) to a specifically paired and internally threaded aperture (47) in a horizontal base plate (34) of the centrifugal feeder (30A) and an identification for reading the specific information as to a make, model and size of part being fed by feeder (30) from another segmented tooling section (31A);
   a connecting means (52) for connecting the tool segment (31) to any other segments;
   a means (48) for removably and securely connecting a tooling ring (81) to an inner peripheral curve (45) of the tooling segment (31);
   the tooling ring (81) with a means (53) for removably and securely connecting at least one selection tool (89, 90, 92) device;
   a means (55) for electrically connecting the selection tool device (89, 90, 92) to a Programmable Logic Controller (PLC) (62);
   a means (56) for mechanically and pneumatically connecting the selection tool (89, 90, 92) device to utilities;
   the at least one selection tool (89, 90, 92) device; wherein one is able to add and remove the at least one top segment sections (31); locate the at least one top segment section (31) with solid dowel pins (32); maintain and use the bowl (30A) as changed for use with the tooling segments (31); and all this is accomplished with a machine system for orienting and aligning articles that uses an equal to a centrifugal bowl feeder (30A).

2. A centrifugal bowl parts feeder system (30) with segmented tooling sections (31) comprised of:

at least one top segment plate (31) having a smooth and flat top surface (41), a smooth and flat bottom surface (42), a pair of smooth and flat ends (43) the pair of ends which are essentially perpendicular to an horizontal base plate (34) of a centrifugal feeder (30A), and a pair of smooth sides (44, 44A), an inner side (44) of the pair of sides being essentially formed as an inner peripheral curve (45) and an outer side (44A) of the pair of sides essentially configured as a segment of a multi-sided polygon, further the top surface (41) having an aperture (46) throughout to the bottom surface (42) for a means (33) for quickly locking the top segmented plate (31) to a specifically paired and internally threaded aperture (47) in the horizontal base plate (34) of the centrifugal feeder (30A), at least one aperture (48) for connecting a means (84) for removably securing a tooling ring (81) along the inner peripheral curve of the side (44), and an identification on bottom surface (42) for reading the information and with specific information as to make, model and size of part being fed by feeder (30), the bottom surface (42) having at least one aperture (46) paired to the top aperture (49) of the base plate (34) for receiving a tapered dowel pin (32) and the bottom surface (42) being contiguously placed on a top surface (41) of the base plate (34), furthermore the ends (43) each having a connecting means (52) for differentiating each of the segmented tooling sections (31) and each end (43) of the segmented tooling section (31) from another segmented tooling section (31A);

a connecting means (52) for connecting the tool segment (31) to any other segments;

a means (48) for removably and securely connecting the tooling ring (81) to the inner peripheral curve (45);

the tooling ring (81) with a means (53) for removably and securely connecting at least one selection tool (89, 90, 92) device;

a means (55) for electrically connecting the selection tool device (89, 90, 92) to a PLC (62);

a means (56) for mechanically and pneumatically connecting the selection tool (89, 90, 92) device to utilities;

the at least one selection tool (89, 90, 92) device;

the PLC (62);

a means to read the identification on the bottom surface of the tooling segment;

a means to transfer specific output information from means to read to input information to the PLC (63);

the base plate (34) of the centrifugal feeder system (30A) with a top surface (54), the said top surface (54) having at least one tapered apertures (49) for receiving the tapered dowel pin (32);

the at least one dowel pin (32) for each base plate (34) aperture (49) paired to the bottom surface (42) apertures (46) of the top plate (31); and the means (33) for quickly locking for removably and securely attaching the top plate (31) through the paired apertures (46, 49) into the base plate (34)

wherein one is able to add and remove the at least one top segment sections (31); locate the at least one top segment section (31) with solid dowel pins (32); maintain and use an identification to track a specific part (60) and range of parts for a similar size and a similar shape with the PLC (62) as the bowl (30A) is changed for use with the tooling segments (31); track the tooling segments (31) and control the parts (60) to coordinate and harmonize their use with the identification connected to PLC (63) and Tooling devices (89,90, 92), and all this is accomplished with a machine system for orienting and aligning articles that uses an equal to a centrifugal bowl feeder (30A).

3. The device according to claim 2 wherein the connecting means for removably securing a tooling ring (81) is a cleat (84).

4. The device according to claim 2 wherein the identification (63) is a radio frequency identification (RFID).

5. The device according to claim 2 wherein the identification (63) is a barcode.

6. The device according to claim 2 wherein the ends (43) connecting means (52) is a dogbone configuration.

7. The device according to claim 2 wherein the ends (43) connecting means (52) is a puzzle piece configuration.

8. The device according to claim 2 wherein the means (33) for quickly locking ends (43) is a threaded rod and a handle.

* * * * *